United States Patent
Gasser et al.

(10) Patent No.: US 11,549,542 B2
(45) Date of Patent: Jan. 10, 2023

(54) FASTENER, FASTENING ARRANGEMENT AND METHOD FOR MOUNTING

(71) Applicant: SFS intec Holding AG, Heerbrugg (CH)

(72) Inventors: Daniel Gasser, Diepoldsau (CH); Thomas Heinzmann, St. Gallen (CH)

(73) Assignee: SFS intec Holding AG, Heerbrugg (CH)

( * ) Notice: Subject to any disclaimer, the term of this patent is extended or adjusted under 35 U.S.C. 154(b) by 402 days.

(21) Appl. No.: 16/643,178

(22) PCT Filed: Aug. 28, 2018

(86) PCT No.: PCT/EP2018/073080
§ 371 (c)(1),
(2) Date: Feb. 28, 2020

(87) PCT Pub. No.: WO2019/042963
PCT Pub. Date: Mar. 7, 2019

(65) Prior Publication Data
US 2020/0332823 A1    Oct. 22, 2020

(30) Foreign Application Priority Data
Sep. 1, 2017  (EP) ..................................... 17188934

(51) Int. Cl.
*F16B 25/00* (2006.01)
*E04D 3/36* (2006.01)
*F16B 25/10* (2006.01)

(52) U.S. Cl.
CPC ........ *F16B 25/0063* (2013.01); *E04D 3/3603* (2013.01); *F16B 25/0021* (2013.01); *F16B 25/103* (2013.01); *F16B 25/00* (2013.01)

(58) Field of Classification Search
CPC .. F16B 5/0275; F16B 5/0283; F16B 25/0021; F16B 25/0057; F16B 25/0063;
(Continued)

(56) References Cited

U.S. PATENT DOCUMENTS 3,682,507 A * 8/1972 Waud .................. F16B 25/0031
411/413
4,653,244 A * 3/1987 Farrell .................. F16B 35/048
411/413
(Continued)

FOREIGN PATENT DOCUMENTS

DE         8908118      10/1989
DE    102009051081      5/2011
(Continued)

*Primary Examiner* — Roberta S Delisle
(74) *Attorney, Agent, or Firm* — Volpe Koenig

(57) ABSTRACT

A fastening arrangement including a grommet, which is configured as a substantially cylindrical sleeve with a head part, with a hollow-cylindrical shaft and with a conical tip, and also a fastener and a nut, for example made of plastic, which is fitted on the first threaded portion of the fastener. The fastener has two threaded portions, wherein one threaded portion is configured as a right-hand thread and the other threaded portion is configured as a left-hand thread (or vice versa). Moreover, the invention comprises a mounting method for such a fastening arrangement, in which the setting operation (anchoring of the fastener, adjustment of the sheath) can be managed in one step without changing the driving direction of the setting tool.

18 Claims, 4 Drawing Sheets

(58) Field of Classification Search
CPC .............. F16B 25/0068; F16B 25/0073; F16B 25/0084; F16B 25/103; F16B 25/00; E04D 3/3603
USPC ............... 411/337, 366.1, 386, 387.1, 387.6, 411/411–413
See application file for complete search history.

(56) References Cited

U.S. PATENT DOCUMENTS

| | | | | |
|---|---|---|---|---|
| 4,781,503 | A * | 11/1988 | Bogel | F16B 25/0063 411/533 |
| 4,878,793 | A * | 11/1989 | Hewison | F16B 25/0031 411/413 |
| 5,816,012 | A * | 10/1998 | Willis | E04C 3/04 52/696 |
| 6,022,177 | A * | 2/2000 | Hofer | F16B 5/0275 411/399 |
| 7,988,396 | B2 * | 8/2011 | Weiss | F16B 35/065 411/416 |
| 8,419,332 | B2 * | 4/2013 | Kochheiser | F16B 5/0275 411/426 |
| 8,480,343 | B2 * | 7/2013 | Vandenberg | F16B 25/0063 411/413 |
| 8,926,249 | B2 * | 1/2015 | Lin | F16B 25/0084 411/386 |
| 2002/0018700 | A1 * | 2/2002 | Shinjo | F16B 25/0057 411/413 |
| 2005/0265806 | A1 * | 12/2005 | Craven | F16B 5/0275 411/386 |
| 2007/0059122 | A1 * | 3/2007 | Lin | F16B 5/0275 411/412 |
| 2007/0128001 | A1 * | 6/2007 | Su | F16B 35/041 411/413 |
| 2011/0250035 | A1 * | 10/2011 | Goldberg | E04B 2/707 411/366.1 |
| 2013/0189052 | A1 * | 7/2013 | Barenski, Jr. | F16B 25/0047 411/413 |
| 2016/0186794 | A1 * | 6/2016 | Belinda | F16B 25/0015 411/387.1 |

FOREIGN PATENT DOCUMENTS

| | | |
|---|---|---|
| EP | 1235988 | 9/2002 |
| EP | 2366843 | 9/2011 |
| EP | 2930378 | 10/2015 |
| JP | H08232930 | 9/1996 |
| WO | 8902504 | 3/1989 |

* cited by examiner

FASTENER, FASTENING ARRANGEMENT AND METHOD FOR MOUNTING

TECHNICAL FIELD

The present invention relates to a fastening arrangement, in particular for securing insulation layers on roofs, to a fastener which is particularly suitable therefor, and to a mounting process for this purpose.

BACKGROUND

In order to meet current requirements concerning the insulation of flat roof structures, it is necessary for different layers of insulation material, according to climate, to be efficiently handled on a supporting substructure. Normally, the cover layer above the insulation layers consists of roof sheeting or plastic film, and the substructure often consists of trapezoidal sheets. For the purpose of fastening, it is known to use a combination of screw and grommet. Here, a "grommet" is normally to be understood as meaning a tubular sleeve with a narrowing at one end and with a radially projecting head widening at the other end. This head widening has the form of an overdimensioned washer which, in the mounted state, abuts on the roof sheeting and really distributes the tensile loads of the fastener. The inner diameter of the shaft of the grommet is of such a size that the fastener, including the head, can be introduced into the grommet—the grommet thus also acting as an extension of the fastener. During the mounting, the fastener, in the grommet, is drilled into the substructure through the insulation layers. The head of the fastener, during the screwing-in operation, abuts against the tip narrowing of the grommet and provides for a tensile load on the grommet according to the placement depth of the fastener. In the case of substructures such as wood or concrete, it is possible in some cases, by way of turning-back of the fastener, for the tensile loads to be controlled, true regulation independent of the anchoring not however being permitted by this.

In sheet-metal substructures, there is furthermore the problem that the engagement of the fastener in the base (the substructure) is very narrow and high stresses are formed through the thread. Adjustment by way of turning-forward or turning-back of the fastener can have an adverse effect on the extraction forces of the fastener.

PRIOR ART

For the purpose of improving adjustability in the case of the fastening of insulation layers on steel sheet structures, EP 2 366 843 therefore proposes to supplement the combination of grommet and fastener with a hexagonal nut on the thread of the fastener. The outer shape of the hexagonal nut corresponds in this case to the geometry of the inner space of the grommet shaft. The nut is therefore longitudinally displaceable along the grommet axis, but the rotation of nut and grommet is linked. In this way, the fastener can be anchored at the intended placement depth, and subsequently, through rotation of the grommet, the anchoring depth of the grommet can be regulated. A disadvantage here is that the head widening of the grommet, specifically in the final mounting phase, exerts an undesired (rotational) driving movement on the film.

SUMMARY

The object of the present invention is therefore to improve the prior art such that the settability of the placement depth of the grommet is improved.

This is achieved by a fastener as well as a fastening arrangement including one or more features of the invention. A process for mounting such a fastening device is also provided.

The invention uses a specially designed fastener in a combination with a grommet and a nut.

Here, in terms of its basic construction, the fastener 10, 20 or 80 comprises a head 11, an adjoining shaft 12 and a tip 13 adjoining the latter, wherein the shaft 12 has a thread section 15 close to the tip 13 and a thread section 17 close to the head 11. In the embodiment of the fastener 80 according to FIG. 6, a nut 50 is fitted there. Furthermore, a stop 18 is arranged between the thread sections (15 and 17). Said stop 18, as will be explained further below, serves as a depth limiter during the driving-in of the fastener 10, 20, 80. It is a characteristic feature that the thread section 15 close to the tip is formed as a right-hand thread and the second thread section 17 is formed as a left-hand thread, or equivalently in a technical sense the thread section 15 is formed as a left-hand thread and the second thread section 17 is formed as a right-hand thread.

Preferably, the nut 50 is molded from plastic or, alternatively, is in the form of a sheet-metal molded part or deep-drawn part. The sheet-metal molded part or deep-drawn part may be produced as a sleeve-like body, wherein an edge of the sheet metal is used replicates a thread edge. Both the plastic design and the sheet-metal design allow inexpensive machine production of this component and facilitate mounting.

The stop 18 mentioned above may be realized as part of a ring-shaped bead 22, whose side facing the tip 13 performs this function. It is also possible to form the stop 18 as part of a thread-free section 16, wherein the outer diameter (core diameter) thereof is of widened form. Alternatively, it is also possible for the runout facing the tip 13 of the second thread section 17 to perform the function of the stop. In other words, both the bead 22 and a thread-free section 16 provide on their side facing the tip 13 a step, a radially projecting stop surface. This stop serves only as a depth limiter for the placement operation in the substructure. After the thread section 17 close to the head is applied in the opposite direction to the first thread section 15, the thread in the section 17 does not engage into the hole dimensioned by the tip 13 and thus, functionally, likewise constitutes a depth limiter. Two variants are provided with their own reference signs 10, 20 in FIG. 1, and a preferred variant is provided with the reference sign 80 in FIG. 6.

In a further embodiment, a thread-free shaft region 21 is arranged between the first thread section 15 and the stop 18. When the fastener is screwed into a steel sheet base, the sheet steel is drawn through the first thread section as far as the stop 18 and remains held in a defined manner in the thread-free section 21 between the stop and the thread runout. Further penetration of the fastener into the base is thus prevented, and the fastener can in this case rotate freely. For the application area of sheet steel, it is in this case advantageous for the tip 13 of the fastener 10, 20, 80 to be formed as a drill tip which, without pre-drilling, can itself be sunk into the material.

In a further embodiment variant, the pitch of the thread in the thread section 15 close to the tip may be selected to be different from the pitch in the thread section 17 close to the head. The pitch may be selected to be larger or smaller depending on configuration.

In a further preferred embodiment variant, the thread section 17 (close to the head) of the fastener 80 is of weakened form at least in a region 82 where the nut 50 is arranged. In this context, "weakened" means that the thread has a smaller thread height than in the remaining shaft region with a thread. As viewed in cross section, the thread is changed for example from a substantially triangular cross section to a trapezoidal cross section. Alternatively, the thread as a whole may be formed so as to be reduced in size, with the triangular cross section maintained.

In a preferred variant, the nut 50 or the region 82 on which it is arranged is fitted on the thread runout close to the head of the thread section 17. Here, "on the thread runout" is to be understood to mean: immediately adjacent to, or overlapping, or completely or partly covering, the thread runout. In particular, the region 82 may be an under-head section. In a particularly preferred variant, the region 82 is formed as a thread-free (under-head) section, which would correspond to a thread with maximum weakness (thread height of zero).

As mentioned above, the fastener 80 is used in a fastening arrangement. This fastening arrangement, beside the fastener 80, additionally comprises a grommet 30, which may constitute a substantially cylindrical sleeve having a head part 31, a hollow-cylindrical shaft 32 and a conical tip 33. In terms of its basic shape, the grommet follows the prior art, wherein the conical tip 33 of the grommet 30 has a passage opening 35 whose diameter is less than the inner diameter of the cylindrical inner space 36 of the shaft 32. The diameters denoted by $D_{max}$ and $D_{min}$ in the figures are thus selected such that $D_{max} > D_{min}$ holds. Here, the cylindrical inner space 36 of the grommet 30 and the passage opening 35 have a common central axis 41. $D_{min}$ is selected such that the tip 13 and the shaft 12 of a fastener 10, 20, 80 can pass through, but not the nut 50.

This is because the transition region between the cylindrical passage opening 35 and the cylindrical inner space 35 in the grommet forms a substantially radially symmetrical, planar or slightly conical stop surface 38.

In the grommet itself, in turn, the head part 31 may be formed in different ways. It may firstly have a flange-like form 37, which is configured to form a holding surface for a pluggable load distribution disk. This load distribution disk may, according to task, be designed from different materials (aluminum, sheet steel, plastic) with different shapes (circular, oval, polygonal) and diameters. Alternatively, the head may have an integral radial head widening 39. Both designs have their specific advantages, which arise from the application profile.

With regard to the nut 50, it is the case that it preferably has a cylindrical shape about a central axis of rotation 51 and, at one longitudinal end, has a force engagement means 52. Due to the introduction of the fastener with the nut into the grommet 30, a force engagement means radially at the outside is not expedient. Therefore, said force engagement means is preferably transferred to the cylindrical front end and, in the pre-mounted state, consequently faces away from the grommet tip 33.

In a first preferred variant, the nut 50 is molded from plastic, and is injected directly onto the section 82 of the second thread section 17 during production. For this purpose, the fastener is placed into a corresponding mold of an injection molding machine and surrounded by the mold. An advantage is that the required thread of the nut is formed during the injection molding operation and the nut is at the same time pre-mounted so as to be correctly oriented. Alternatively, the nut 50 may be formed as a sheet-metal molded part or deep-drawn part, which is pushed onto or screwed onto a section of the second thread section 17. It is of course also possible for a separately produced nut 50 composed of plastic to be pushed on or screwed on.

Due to the two oppositely running threads 15 and 17, pushing-on or screwing-on is of course expediently possible only if the thread of the nut 50 is configured so as to match the sense of rotation of the thread section 17. Therefore, most advantageously, the outer diameters of the thread section 15 close to the tip and of the stop 18 are selected to be less than the free inner thread diameter of the nut 50. Here, "free inner thread diameter of the nut" means the free passage, as measured diametrically from thread crest to thread crest of the inner thread. In this way, a nut 50 can pass the thread section 15 close to the tip, and also the stop 18, in order subsequently to be screwed onto the thread section 17 close to the head.

The mounting process for the above-described fastener or the discussed fastening device can be described with the following steps:

provision of a fastening arrangement as described above, wherein the fastener 80 is introduced with the nut 50 into the inner space 36 of the grommet 30. This pre-mounting may be carried out at the factory or be performed on the construction site. It is expedient for the combination of fastener 80 and nut 50 to have been pre-mounted and, on site, to be combined, through insertion, with a grommet of matching length, according to the thickness of the insulation layers to be handled.

pushing or screwing of the fastening arrangement into a building envelope composed at least of a cover film, an insulation layer and a support sheet (as seen in the working direction). This pushing-in may be realized manually, depending on thickness and toughness. The tip of the fastener (drill tip) is generally sufficient for bringing the combination of fastener and grommet into position. Alternatively, it is also possible for the combination to be plugged onto a placement tool (drilling machine with tool), and for the cover film and the insulation layer consequently to be penetrated with motorized assistance.

drilling-through of the support sheet with the aid of the drill tip until the support sheet abuts against the stop 18 and the fastener 80 overwinds. The drilling operation results in the first thread section 15 drawing the fastener into the support sheet until the latter reaches the thread-free shaft region 18 and, there, is held between the last thread turn and the stop 18.

securing of the nut 50 against the (driving) rotational movement of the fastener by means of a tool, wherein the nut 50 moves on the second thread section 17 of the fastener 80 in the direction of the tip 13.

After the abutment of the nut 50 against the stop surface 38 of the grommet 30, driving of the grommet, and movement thereof in the direction of the substructure, by the nut 50 during the further rotational movement of the fastener 80. Here—by contrast to the prior art—the grommet itself is not forcibly driven in rotation, and loading of the cover film is thus avoided.

ending of the rotational movement upon attainment of the required placement depth of the grommet 30.

The advantage of the process is consequently that the rotational direction of the fastener 80 can be maintained during the entire placement operation of the fastening arrangement. The difference in thread direction between the first and second thread sections 15, 17 permits this procedure.

If the first thread section 15 is formed as a right-hand thread and the second thread section 17 is formed as a left-hand thread, the direction of rotation during drilling-in is classically clockwise. If the first thread section 15 is formed as a left-hand thread and the second thread section 17 is formed as a right-hand thread, the direction of rotation during the mounting is the opposite direction, that is to say counterclockwise. The mounting principle as described above is preserved, however—the direction of rotation of the placement unit is maintained in both cases.

In order for this method of use to be permitted, the associated tool is essentially of two-part design. It comprises a central part which has a cylindrical rod, on one end of which there is fitted a tool head which is able to interact with a force engagement means 19 in the head 11 of the fastener 10 or 20 or 80. The tool furthermore comprises a tubular sleeve which is able to be arranged in a coaxial manner around the cylindrical rod and which is formed at one of its ends such that it fits into the force engagement means 52 of the nut 50. The outer diameter of the tubular sleeve is selected to be slightly less than $D_{max}$ of the inner space 36 of the grommet 30. The free inner diameter of the tubular sleeve is sufficient to surround a fastener with connected drive tool.

During the placement of the fastener, only the central rod, via the tool head, is in engagement with the force engagement means in the head of the fastener. After the placement of the fastener, the fastener continues to rotate in an idling manner. The sleeve can then be pushed into the grommet along the shaft until it reaches the nut 50 being driven (still on the fastener). The sleeve engages into the force engagement means 52 of the nut and brakes the nut or holds the nut stationary. Due to the thread on the second thread section 17, which thread is oppositely directed in comparison with the first thread section 15, with maintained rotation of the fastener, the nut 50 is moved deeper into the grommet in the direction of the substructure until, as described above, it abuts against the stop surface 38 of the grommet.

For the operator, this procedure means that time is saved, because said operator is able to complete the placement and adjustment operations in one working step. As soon as the fastener has reached its placement depth, said fastener, without the driving movement being interrupted or the direction of rotation being changed, can, with the sleeve being pushed over, begin the adjustment operation and control it in a targeted manner such that the grommet is placed at the required depth.

BRIEF DESCRIPTION OF THE FIGURES

The invention will now be explained by way of example on the basis of particularly preferred embodiments with reference to the appended drawings.

DETAILED DESCRIPTION

Figure 1:
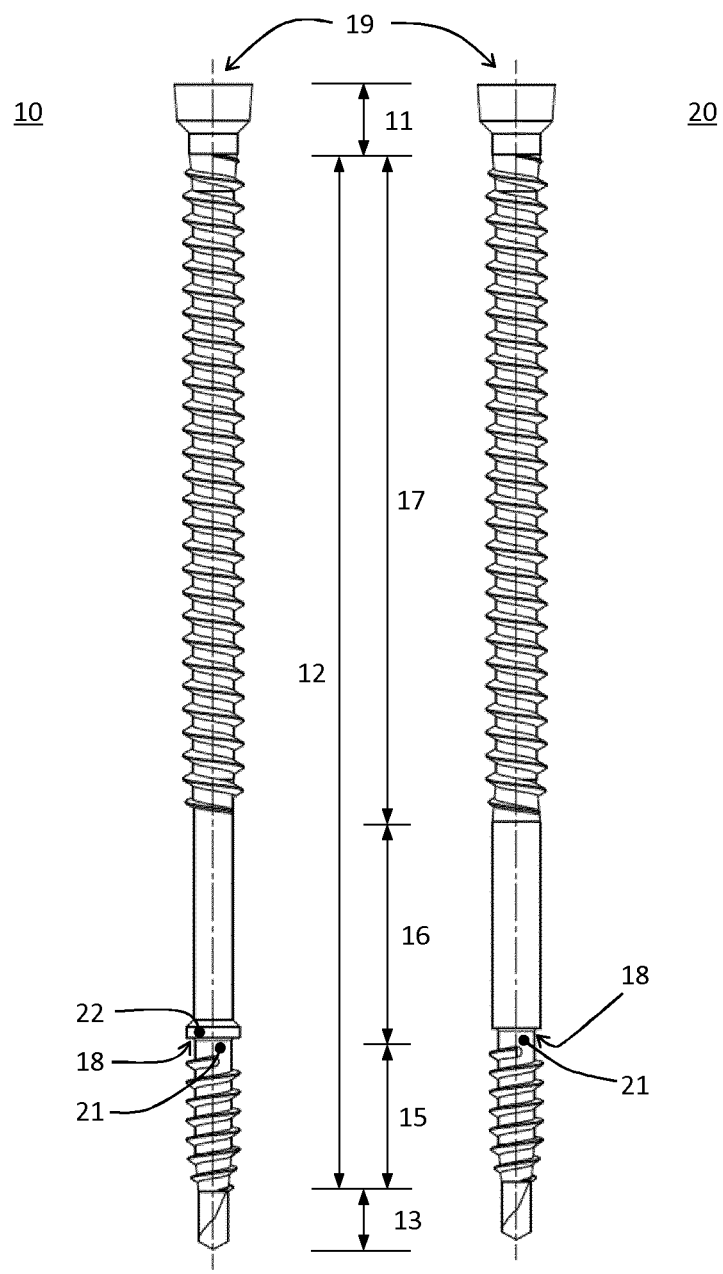
FIG. 1 shows two embodiment variants of a fastener according to the invention without a nut.

In FIG. 1, the reference signs 10 and 20 are used to show respective variants of a fastener. The difference is not in the function, but merely in the technical design at one point. In both cases, the main constituent parts are a head 11, an adjoining shaft 12 and a (drill) tip 13. Both variants bear on the shaft two thread sections 15 and 17, of which one is formed as a left-hand thread and the other is formed as a right-hand thread (or vice versa). A thread-free section 16 is shown therebetween in FIG. 1. The stop 18 is formed as a separate bead 22 in the left-hand variant 10, and as a projection of a shaft section in variant 2. In terms of function, both perform the same task, as described further above. The thread-free shaft region 21 serves as a holding region for the support sheet of the substructure as soon as the fastener has reached its end position.

In FIG. 1, the force engagement means 19 is merely indicated as an inner engagement means in the flange-like widening of the head 11. Alternatively, it is also possible for an outer engagement means (for example in the form of a square or hexagon) to be realized. A slender design is preferred to ensure the functionality as described above.

Figure 2:
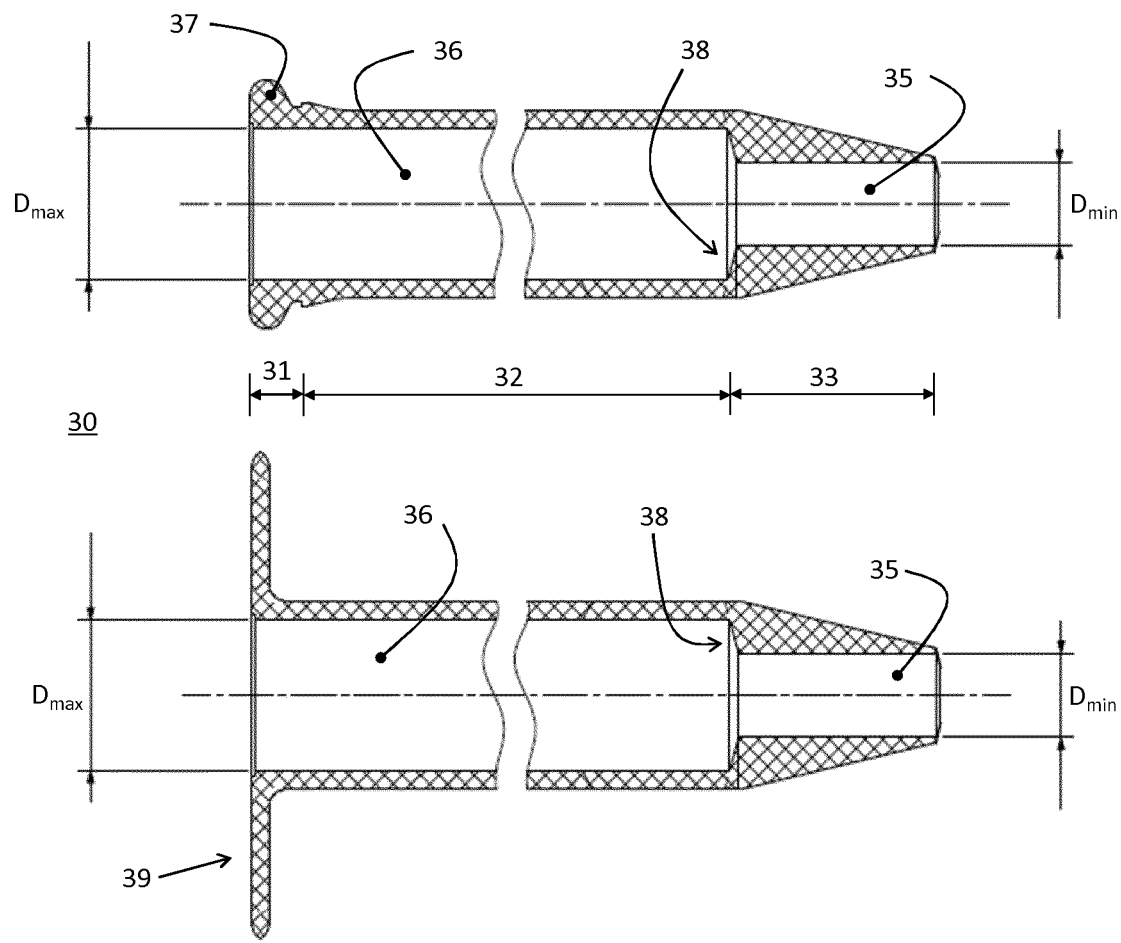
FIG. 2 shows two variants of a grommet according to the invention.
Figure 4:
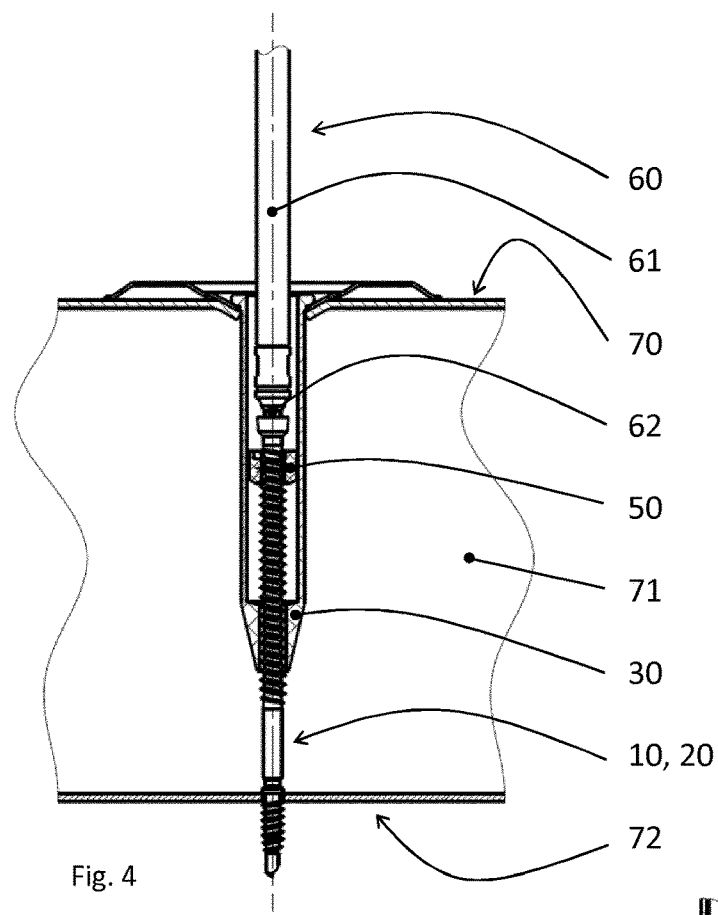
FIGS. 4 and 5 show different phases of a placement operation for a fastening arrangement according to the invention.
Figure 5:
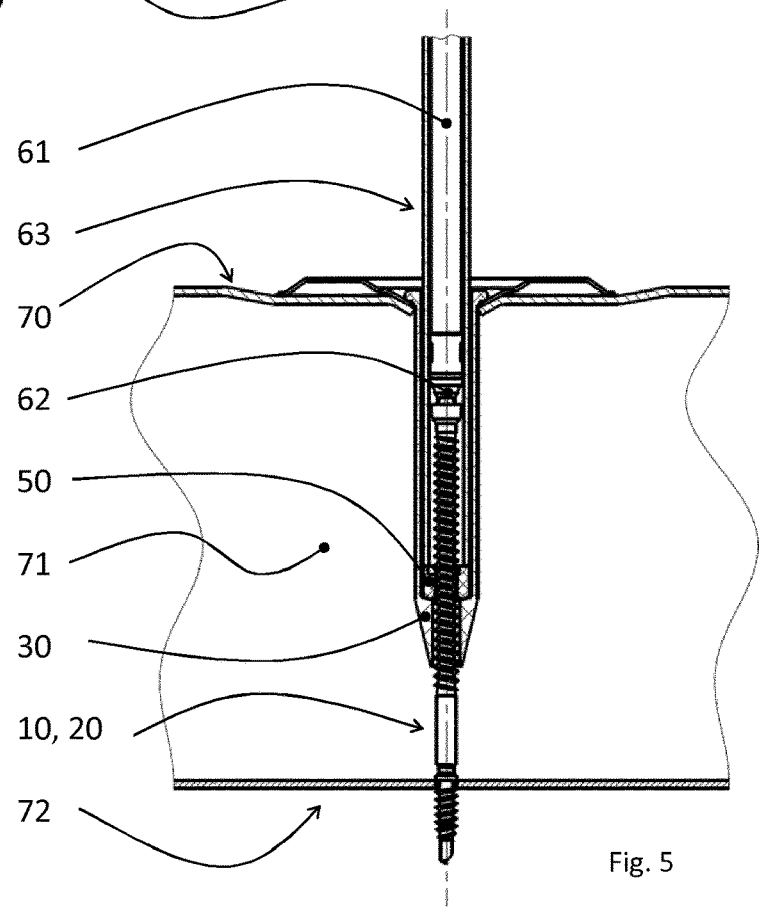

FIG. 2 shows a grommet 30 in two embodiment variants. It consists substantially of a head (part) 31, a cylindrical or hollow-cylindrical shaft 32 and, in turn adjoining the latter, a conically tapering tip 33. The free inner diameter $D_{max}$ of the head part 31 and the shaft 32 is arranged in a coaxial manner about a common central axis 41 and is also of (hollow-)cylindrical configuration and is dimensioned such that the cylindrical inner space 36 can receive a tool 60 with attached fastener 10 or 20 plus the above-described sleeve 63. The inner space 36 transitions into a cylindrical passage opening 35, the transition in this case forming a stop surface 38 which faces the grommet head 31. The upper variant of the grommet 30 has a flange or a flange-like head 37. Said flange or flange-like head serves as a boundary for holding a load distribution disk which is to be plugged on or is able to be plugged on. FIGS. 4 and 5 show such a plugged-on load distribution disk during use. The variant in FIG. 2 at the bottom is shown with a load distribution disk 39 which is an integral part of the grommet 30. This embodiment reduces the complexity of the system composed of fastener 10, 20 with nut 50, grommet 30 and pluggable load distribution disk, but has the disadvantage of less flexibility during use.

Figure 3:
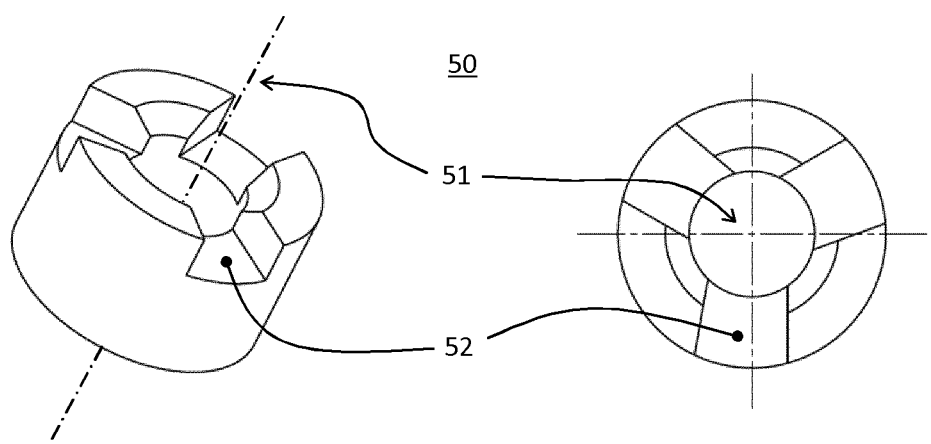
FIG. 3 shows, in perspective and in an axial plan view, a nut according to the invention.

FIG. 3 shows a nut 50 in a perspective view (left) and plan view (right). At its end which, in the pre-mounted state, faces the fastener tip 13, a force engagement means 52 which can interact with the tool 60 in the above-described manner is added. Shown in the present case are three cutouts which are offset by 120° and into which complementary projections of the tool can engage. The central axis 51 then also forms the central axis of the tool 60 or the sleeve 63. This preferred embodiment is not restrictive, a person skilled in the art being able to configure equivalent variants according to his or her specialist knowledge. In particular, variants with only one cutout, two cutouts (180° offset) or else 4 cutouts (90° offset) may be used. An end toothing is also possible. The tools are designed to be complementary thereto.

FIGS. 4 and 5 show snapshots of the mounting process. The moment at which the fastener 10, 20 has reached its installation depth and overwinds can be seen in FIG. 4. The cylindrical rod 62 of the tool 60 is, via the tool head 62, in engagement with the head of the fastener 10, 20. The nut 50 is situated on the second thread section, but has not been sunk yet. The grommet 30 has a plugged-on load distribution disk. The insulation layer 71 still lies loosely on the support sheet 72.

FIG. 5 shows the moment at which the mounting is completed. The tubular sleeve has been pushed over the cylindrical rod 61 of the tool 60 such that the sleeve engages into the force engagement means of the nut 50. While the fastener rotates further via the rod 61, the sleeve 63 brakes the nut 50, whereby the latter begins to move in the direction of the fastener tip (downward in the drawing). In this way, the grommet is drawn in the direction of the support sheet 72, this being indicated in FIG. 5 as a slight deformation of the cover film 70. Immediately afterwards, the tool 60 can be pulled out together with the sleeve and the next fastening arrangement can be placed.

Figure 6:
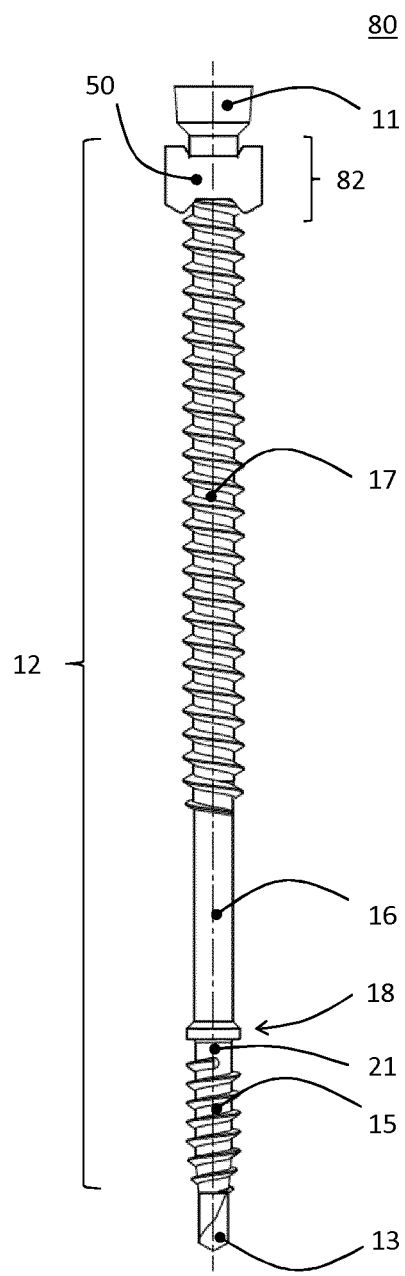
FIG. 6 shows a fastening arrangement comprised of fastener and nut.

FIG. 6 shows a fastening arrangement composed of a fastener 80 and a nut 50. A head 11 is adjoined by a shaft 12 with a (drill) tip 13. As already explained in relation to FIG. 1, two thread sections 15 and 17 are situated on the shaft, of which one is formed as a left-hand thread and the other is formed as a right-hand thread (or vice versa). A thread-free section 16 is arranged therebetween. The stop 18, as a depth limiter, is shown as a separate bead, this however being meant to be exemplary only and non-restrictive. The thread-free shaft region 21 serves as a holding region for the support sheet of the substructure as soon as the fastener has reached its end position.

Section 82 marks that region in which the nut 50 is advantageously arranged. In this region, the thread is of weakened form, or region 82 is produced as a thread-free under-head section.

The features of the invention that are disclosed in the above description, in the drawings and in the claims may be of importance both individually and in any desired, albeit technically expedient or advantageous, combination for the realization of the invention. A combination of features that is not explicitly presented does not mean that such a combination is not expedient or is not possible.

The invention claimed is:

1. A fastener, comprising:
   a head,
   a shaft adjoining said head, and
   a tip adjoining said shaft,
   a first thread section on the shaft close to the tip,
   a second thread section on the shaft close to the head,
   a nut fitted on the second thread section,
   a stop arranged between the first thread section and the second thread section, and
   the first thread section close to the tip is formed as a right-hand thread and the second thread section close to the head is formed as a left-hand thread, or the first thread section close to the tip is formed as a left-hand thread and the second thread section close to the head is formed as a right-hand thread,
   wherein the nut has a cylindrical shape about a central axis of rotation and, at one longitudinal end, has a force engagement projection or recess.

2. The fastener as claimed in claim 1, wherein the nut is molded from plastic or is a sheet-metal molded part or deep-drawn part.

3. The fastener as claimed in claim 1, wherein the stop comprises part of a ring-shaped bead, a section with enlarged core diameter of a thread-free section, or runout facing the tip of the second thread section close to the head.

4. The fastener as claimed in claim 1, further comprising a thread-free shaft region arranged between the first thread section and the stop.

5. The fastener as claimed in claim 1, wherein the tip comprises a drill tip.

6. The fastener as claimed in claim 1, wherein a pitch of the thread in the first thread section differs from a pitch in the second thread section.

7. The fastener as claimed in claim 1, wherein outer diameters of the first thread section close to the tip and of the stop are less than a free inner thread diameter of the nut.

8. The fastener as claimed in claim 1, wherein the second thread section has a weakened form at least in a region where the nut is arranged.

9. The fastener as claimed in claim 8, wherein the nut or the region is arranged on a thread runout close to the head of the second thread section.

10. The fastener as claimed in claim 8, the region is formed as a thread-free section.

11. A fastening arrangement comprising
   a grommet formed as a substantially cylindrical sleeve having a head part, a hollow-cylindrical shaft and a conical tip, and
   a fastener as claimed in claim 1.

12. The fastening arrangement as claimed in claim 11, the conical tip of the grommet has a passage opening having a diameter that is less than an inner diameter of a cylindrical inner space of the shaft, and the cylindrical inner space and the passage opening have a common central axis.

13. The fastening arrangement as claimed in claim 12, wherein a transition region between the cylindrical passage opening and the cylindrical inner space forms a substantially radially symmetrical, planar or slightly conical stop surface.

14. The fastening arrangement as claimed in claim 13, wherein the head of the grommet either has a flange-shaped form, configured to form a holding surface for a load distribution disk, or an integral radial head widening.

15. A method for mounting a fastening arrangement, comprising the following steps:
   providing a fastening arrangement as claimed in claim 13 in which the fastener is introduced with the nut into the inner space of the grommet,
   pushing or screwing the fastening arrangement into a building envelope comprised at least of a cover film, an insulation layer and a support sheet,
   drilling-through the support sheet with the aid of the tip which is configured as a drill tip until the support sheet abuts against the stop and the fastener overwinds,
   securing the nut against rotational movement of the fastener by a tool by moving the nut on the second thread section of the fastener in a direction of the tip,
   abutting the nut against the stop surface of the grommet and driving the grommet by the nut during a further rotational movement of the fastener, and
   ending the rotational movement upon attainment of a placement depth of the grommet.

16. The method as claimed in claim 15, wherein driving direction of the fastener is maintained during the entire placement operation of the fastening arrangement.

17. The fastening arrangement as claimed in claim 11, wherein the nut is molded from plastic, and is injected directly onto a section of the second thread section close to the head.

18. The fastening arrangement as claimed in claim 11, wherein the nut is pushed onto or screwed onto a section of the second thread section close to the head.

* * * * *